United States Patent [19]

Taylor et al.

[11] 4,020,204
[45] Apr. 26, 1977

[54] VINYL TRANSFER SHEET MATERIAL AND METHOD FOR APPLYING SAME TO VINYL SUBSTRATE

[75] Inventors: John Sebring Taylor, Newark, Del.; Wilbur Thomas Brader, Media, Pa.

[73] Assignee: FMC Corporation, Philadelphia, Pa.

[22] Filed: Dec. 24, 1975

[21] Appl. No.: 644,219

[52] U.S. Cl. .................................. 428/40; 428/41; 428/508; 428/510; 156/247; 156/230; 156/240; 156/249

[51] Int. Cl.² .................. E04F 13/20; E04F 15/16

[58] Field of Search .......... 156/247, 230, 240, 249; 428/510, 508, 40

[56] References Cited

UNITED STATES PATENTS

| | | | |
|---|---|---|---|
| 2,329,456 | 9/1943 | Campbell, Jr. ...................... | 260/42 |
| 3,280,061 | 10/1966 | Favreau .......................... | 428/510 X |
| 3,549,482 | 12/1970 | Okutani ............................. | 428/40 |
| 3,551,241 | 12/1970 | Heeb et al. ...................... | 428/40 X |
| 3,869,336 | 3/1975 | Sander et al. ..................... | 161/146 |
| 3,926,707 | 12/1975 | Glaser et al. .................. | 156/247 X |

*Primary Examiner*—P. C. Ives
*Attorney, Agent, or Firm*—Christopher Egolf; Eugene G. Horsky

[57] ABSTRACT

A protective vinyl transfer sheet material and a method for laminating such transfer sheet material to a vinyl substrate. The transfer sheet material consists of a film of plasticized vinyl resin releasably supported with measurable adhesion on one side of a continuous, flexible, non-fibrous cellulosic carrier, particularly regenerated cellulose sheet. In the method of the present invention, the vinyl film is bonded under pressure with heat to the vinyl substrate, after which the cellulosic carrier may be readily stripped from the laminate, leaving the firmly bonded vinyl film as a protective overcoating for the substrate.

10 Claims, No Drawings

VINYL TRANSFER SHEET MATERIAL AND METHOD FOR APPLYING SAME TO VINYL SUBSTRATE

BACKGROUND OF THE INVENTION

1. Field of Invention

The present invention relates to vinyl transfer films. More specifically it relates to a vinyl transfer sheet material and a method of preparing a protected vinyl substrate by bonding the transfer sheet material onto the substrate.

2. Background of the Prior Art

Decorative vinyl sheet materials, such as wallcoverings, are conventionally manufactured by lamination of a cast vinyl film onto a scrim support or other reinforcing backing. The exposed surface of the applied vinyl film is then printed with a decorative design. This printed surface usually remains unprotected. Consequently, the decorative surface vinyl sheet materials is vulnerable to damage as by scuffing, scrubbing or chemical action (solvents, cleansers, and the like). More importantly, the vinyl surface of such reinforced vinyl sheet materials is rough in texture and is not conducive to high quality printing of decorative designs.

Other vinyl materials, such as vinyl asbestos floorcovering, are formed into continous sheets by calendering a uniform mix of vinyl, reinforcers, and other ingredients. Such vinyl sheet materials are often subject to a high degree of abrasive wear and tear in normal use that is very detrimental to decorative indicia printed on the unprotected surface.

SUMMARY OF THE INVENTION

In accordance with the present invention, a vinyl transfer sheet material is applied as a protective and desirably transparent coating onto a vinyl substrate. The vinyl transfer sheet material consists of an unbroken film of plasticized vinyl resin releasably supported with measurable adhesion on one side of a continous, flexible, non-fibrous cellulosic carrier, preferably regenerated cellulose. The vinyl resin employed is a film-forming copolymer consisting essentially of about 75 to 95% vinyl chloride and 5 to 25% vinyl acetate, and also from about 5 to 20 parts of plasticizer per hundred parts (phr) of copolymer resin. The above-noted percentages and those hereafter given for vinyl chloride or vinyl acetate are by weight based on the weight of the copolymer resin.

In the application of the vinyl transfer sheet material to a vinyl substrate, the exposed vinyl film surface of the transfer sheet material is first contacted with the substrate. Pressure, in the presence of heat, is applied to the contacting surfaces of the vinyl film and the vinyl substrate so as to provide a laminate in which the vinyl film is tenaciously bonded to the vinly substrate.

After the laminate is cooled, the carrier sheet, on which the vinyl film is supported with measurable adhesion, may thereafter be readily stripped from the vinyl film which is now securely bonded to the substrate.

An object of this invention is to provide a new or improved and generally more satisfactory vinyl transfer sheet material and a method for preparing protected vinly substrates utilizing the vinyl trasfer sheet material. A second object is to provide a new method for making scrim-backed or otherwise reinforced vinyl materials having printed indicia thereon, for example, decorative wallcoverings or floorcoverings.

Another object of the present invention is to provide a reinforced vinyl material having better quality printing of decorative and other indicia. Such indicia may be reverse-printed onto the vinyl film of the vinyl transfer sheet material prior to its being bonded onto the reinforced vinyl substrate. The vinyl film and non-fibrous cellulosic carrier of the transfer sheet material are preferably transparent so as to facilitate inspection of the reverse-printed indicia both before and after bonding of the vinyl transfer sheet material to the substrate.

Still another object is to provide an improved vinyl material having printed indicia protected by a vinyl overcoating which offers some degree of resistance to scuffing, scrubbing and chemical attack of the indicia while in use.

DETAILED DESCRIPTION

The vinyl transfer sheet material of the present invention utilizes a vinyl resin that consists of a film-forming copolymer of vinyl chloride and vinyl acetate, containing from about 75 to 95% by weight vinyl chloride and from about 5 to 25% by weight vinyl acetate. A vinyl copolymer resin found particularly suitable for use in the transfer sheet material of the present invention is one containing about 86% by weight vinyl chloride and about 14% by weight vinyl acetate. Such specific copolymer resin is commercially available from Union Carbide Corporation under the trademark of "Bakelite Vinyl Solution Resin VYHH."

Applied as an unbroken film onto one side of a non-fibrous cellulosic carrier, the vinyl copolymer resin exhibits low but measurable adhesion to the cellulosic carrier on which it is releasably supported. The actual level of adhesion between the vinyl film and the non-fibrous cellulosic carrier in the vinyl transfer sheet material of the present invention is not critical. Minimally, the adhesion is sufficient to enable the vinyl transfer sheet material to be collected, stored (as in roll form), transported and subjected to ordinary and expected processing operations, both as is and after bonding to a vinyl substrate, all without the vinyl film accidentially separating from the carrier. At the other extreme, after the vinyl transfer sheet material has been tenaciously bonded to a vinyl substrate, the adhesion of the carrier to the vinyl film is low enough to permit stripping of the carrier from the laminate without difficulty. The non-fibrous cellulosic carrier will separate from the vinyl film bonded to the laminate without the carrier tearing, shredding or releasing only partially. Likewise, the adhesion is sufficiently low to preclude similar damage to the bonded vinyl film when the carrier is stripped away.

A plasticizer is added to the vinyl resin to provide a desired flexibility to the vinyl film and, also, to assist in promoting adhesion of the vinyl film to the vinyl substrate during the bonding or application step. Suitable plasticizers are those having lower volatility and typically used with vinyl resins, which include acetylated tri-($C_1$-$C_6$) alkyl citrates, and di-($C_1$-$C_{11}$) alkyl phtalates, adipates, and the like. An acetylated tri-($C_1$-$C_6$) alkyl citrate, such as acetyl tributyl citrate, has been found to be a satisfactory plasticizer.

The vinyl plasticizers are desirably incorporated at about 5 to 20 parts per hundred parts of resin (phr). Within the desired range, the amount of vinyl plasticizer may be varied so as to optimize bonding of the vinyl transfer sheet material to the substrate at satisfactory bonding pressures and temperatures. Excess plasticizer tends to impair film properties, such as its abrasion resistance and its adhesion to the substrate. Insufficient plasticizer necessitates high temperatures to effect bonding of the transfer sheet material to the substrate. Such temperatures may be detrimental to the vinyl transfer sheet material, resulting in a poor appearance of the bonded vinyl film.

Slip and anti-blocking agents are advantageously incorporated into the vinyl resin for reducing the stickiness or tackiness of the vinyl film in the vinyl transfer sheet material, thus facilitating process operations such as collection of the material in rolls. An aqueous finely divided clay dispersion, of about 0.5 to 1.5 phr, has been found beneficial for this purpose. Other suitable slip and anti-blocking agents include talc, silica, and other similar mineral fillers in the size range of about 0.5 to 5.0 microns.

The vinyl resin film is desirably transparent, thus making visible any indicia printed thereon. Printed designs or other indicia may be either reverse-printed onto the outer surface of the vinyl film or applied to the vinyl substrate to be covered by the clear film, and thus in both instances the indicia are locked between the protective vinyl film and the substrate. Pigments or dyes may either be applied to the vinyl film or added to the vinyl copolymer resin, if complete transparency of the protective film is not a requirement. The vinyl resin may also contain various materials to modify the transfer film properties as desired, including, for example, flame retardants, ultra-violet light shielding agents, decorative fillers and the like.

Moistureproofing wax materials and their associated blending agents, typically used in vinyl-coating cellulosic packaging films, are not essential to the present invention. Nevertheless, such ingredients may, if desired, be incorporated into the vinyl resin without detriment to the physical properties and performance characteristics of the vinyl film in the transfer sheet material of this invention.

The non-fibrous cellulosic carrier for the vinyl film in the vinyl transfer sheet material of the present invention is continous and flexible. Such flexible non-fibrous cellulosic carriers include, for example, regenerated cellulose, hydroxyethyl cellulose, hydroxypropyl cellulose, carboxymethyl cellulose, cellulose acetate, and the like. From the standpoint of commerical availability and physical properties, regenerated cellulose carrier sheets are preferred for this invention.

Regenerated cellulose carrier sheets have a smooth surface that allows ready application of a uniform vinyl film thereon which adheres to the carrier sheet in a very satisfactory manner. Vinyl transfer sheet material utilizing regenerated cellulose as a carrier are readily stored or shipped in roll form. Once the vinyl transfer sheet material has been bonded to the substrate, the regenerated cellulose carrier may easily be stripped from the laminate as a continuous sheet, leaving behind the protective vinyl film overcoating on the substrate.

The transparency of the preferred regenerated cellulose carrier facilitates inspection of any reverse-printed decorative indicia on the vinyl film of the transfer sheet material before, as well as after, bonding of the transfer sheet material to the vinyl sheet substrate, thus permitting good quality control.

Likewise, indicia printed on the vinyl sheet substrate overcoated by the protective vinyl film of the vinyl transfer sheet material can also be viewed through the bonded tranparent vinyl sheet transfer material. Because such inspections are feasible after the bonding of the vinyl transfer sheet material to the substrate, without the need to remove the transparent regenerated cellulose carrier, the carrier may be temporarily left unstripped during subsequent operations involving the laminate.

The cellulosic carrier is plasticized to provide the requiste flexibility and durability needed in the present invention. A plasticizer of relatively low volatility is desirable to minimize losses during bonding, in the presence of heat, of the transfer sheet material onto the vinyl substrate.

The plasticizer for the cellulosic carrier should be non-reactive with and relatively insoluble in the vinyl film of the vinyl transfer sheet material. Thus, plasticizers which tend to migrate from the cellulosic carrier into the vinyl film with deleterious effects on film properties should be avoided. Glycerine has been found to be a satisfactory plasticizer for regenerated cellulose carrier sheets, in amounts between of from about 10 to 25% by weight.

Particulate matter may be incorporated into the cellulosic carrier during its preparation, as, for example, to modify cellulosic carrier properties or to control the gloss of the vinyl film surface in contact with the cellulosic carrier. For example, film handling and slip characteristics of regenerated cellulose carrier sheets are improved by the addition of microcrystalline cellulose to the viscose used to form such sheets. Glossiness may be controlled by addition of mineral or resin fillers or microcrystalline cellulose to the cellulosic carrier-forming material. The vinyl film of a vinyl trasfer sheet material modified in this fashion exhibits a reduced glossiness or satin-like finish when the transfer sheet material is bonded to a substrate and stripped of the carrier.

As mentioned previously, adhesion between the mon-fibrous cellulosic carrier and the vinyl film supported thereon is low but measurable. The desired level of adhesion between the vinyl film and cellulosic carrier is readily achieved without resort to coating anchoring agents, which are generally used to enhance coating adhesion in the manufacture of packaging films. However, the addition of substantial amounts of particulate fillers to the non-fibrous cellulosic carrier may decrease the carrier surface smoothness, thereby affecting the adhesion of the vinyl film on the carrier. Consequently, coating anchoring agents in limited amounts, dependent upon the quantity of particulate fillers present, may be required to achieve a minimally acceptable level of vinyl film-to-carrier adhesion. For example, for filler-loaded cellulosic carriers, the film-forming vinyl copolymer resin of this invention may be modified with small amounts of carboxyl group-containing components to obtain satisfactory adhesion of the resultant film to such a carrier.

The film-forming vinyl resins are preferably applied as a coating onto one side of the cellulosic carrier, normally in the form of an organic solvent solution. The vinyl resin may be applied to the cellulosic carrier by any of the methods conventionally used in the manufacture of coated cellulosic film. These methods may involve dipping, spraying or roll-coating of the vinyl resin. The amount of coating applied is not critical and thus may be varied. The coating is metered by any known means so as to provide a finished film coating desirably of uniform thickness of from between 0.5 to 5.0 grams per square meter and preferably from about 1.5 to 3.0 grams per square meter.

Vinyl transfer sheet materials as described above are laminated to a vinyl substrate by the application of pressure in the presence of heat using conventional techniques such as calendering rolls, plate presses and the like. The vinyl substrate may be a sheet material or a rigid member and may be formed entirely of vinyl or have an exposed vinyl layer or surface. In the lamination, the exposed vinyl film surface of the vinyl transfer sheet material is first contacted with the vinyl substrate. The exposed vinyl film surface of the vinyl transfer sheet material may, of course, have decorative or other indicia reverse-printed thereon. Pressure is applied, in the presence of heat, either concurrently with or subsequent to the initial contacting of the vinyl transfer sheet material with the substrate, such that a tenacious bond is formed between the contacting surfaces of the laminate. The presence of printed indicia, either on the vinyl film or on the substrate, does not prevent good bonding form occuring between the vinyl film of the transfer sheet material and the vinyl substrate. The bonding step may, if desired, be performed using embossing rolls to form relief ornamentation on the laminate while simultaneously providing the requisite pressure in the presence of heat to insure lamination.

After the vinyl transfer sheet material has been bonded to the substrate and allowed to cool, the non-fibrous cellulosic carrier may readily be stripped from the laminate. The non-fibrous cellulosic carrier may optionally be left on the laminate, such as during further processing steps, transport, storage, etc. By way of example, the transparent cellulosic carrier of a vinyl transfer sheet material bonded to a decorative vinyl wallcovering may temporarily be left in place until after final application to a wall surface, affording additional protection during shipment and application.

The adhesion of the vinyl film to the cellulosic carrier in the transfer sheet material may be measured by the test procedure described below. The test also indicates whether an effective bond has resulted between the transfer sheet material and the substrate after lamination.

Samples of the laminate, i.e., vinyl transfer sheet material bonded to a vinyl substrate, are used. Laminate samples, measuring 1 inch by 2 inches at the laminate bond and having an unbonded or partially stripped portion extending beyond the two inch length laminated portion, are used for each test.

The force required to strip the cellulosic carrier away from the laminate is measured by placing the partially stripped or unbonded laminate portion of the sample in one jaw of a Suter Tester and the stripped or unbonded carrier the other jaw. The jaws of the Suter Tester move directly away from each other, at a rate of 12 inches per minute. Adhesion of the cellulosic carrier to the laminate in the 1 inch by 2 inch bonded portion of the laminate sample is thus measured in grams per 2 inch length. If the pressure and/or heat used in the laminatin are insufficient to effect bonding of the vinyl film surface of the transfer sheet material onto the vinyl substrate, the test will yield an adhesion measurement of zero. In such a case, the cellulosic carrier remains adhered to the vinyl film coating thereon, and the unbonded vinyl transfer sheet material simply separates from the substrate The principles, features and advantages of the invention will be further understood upon consideration of the following specific examples.

EXAMPLE I

A regenerated cellulose film, of 150 gauge thickness ($150 \times 10^2$ square inches/pound), plasticised with 17% by weight glycerine and containing 0.3–0.6% of Avicel RC-591 (FMC Corp. trademark) microcrystalline cellulose acting as a particulate slip agent was coated on one side with a 15% solution of vinyl resin in a solvent mixture of 50% toluene and 50% butyl acetate. The flim-forming vinyl resin was a copolymer of 86% by weight vinyl chloride and 14% by weight vinyl acetate; and also contained 18 parts per hundred parts of resin (phr) of Citroflex A-4 (Chas, Pfizer & Co., Inc. trademark) plasticizer, a commercially available acetyl tributyl citrate; 4 phr of Poly-pale (Hercules, Inc. trademark) maleic acid-treated rosin ester used as an anti-blocking agent; and 1.2 phr of kaolin clay as a slip and anti-blocking agent. The solvent was evaporated to obtain a coating thickness of 2.4 –2.5 grams per square meter one side of the regenerated cellulose carrier sheet.

The vinyl film surface of this transfer sheet material was then laminated under pressure with heat onto the vinyl side of a non-embossed, cloth-backed vinyl wallcovering. This lamination was performed using a laboratory multiple heat sealer, which permitted evaluation of bonding as a function of temperature. The multiple sealer had opposing plates which were pressed together at 0.5 psi for 0.75 second; only one of the two opposing plates was heated. The profile of sealing temperature available extended between 168° to 400° F.

When the substrate was in contact with the heated sealer plate, a tenacious bond was achieved between the vinyl transfer sheet material and the vinyl wall covering substrate at temperatures of from above 240° F to the maximum temperature tested, 400° F. When the transfer sheet material was placed in contact with the heated sealer surface, good bonding was obtained at temperatures between about 205 ° to 300° F. At 325° F and above, the vinyl transfer sheet material bonded to the substrate had a poor appearance.

After cooling, the cellulose carrier sheet was readily stripped from the vinyl film-vinyl wallcovering laminate. The adhesion of the cellulose carrier to the laminate was low, typically about 40 grams per 2 inch length, as measured in the adhesion test described above.

The adhesion of the cellulose carrier in the vinyl transfer sheet material was examined from a different perspective by substituting a second sample of the same transfer sheet material in place of the substrate, i.e., bonding the vinyl film surfaces of two identical vinyl transfer sheet material samples together. Using the multiple heat sealer in these tests, effective bonding between the two vinyl film surfaces was achieved over the entire temperature range studied, namely, 168° to 400° F. Adhesion of the celllulose carrier to the vinyl film coating thereon in the adhesion test typically ranged between 10 to 30 grams over the entire temperature profile.

A second heat sealer, a Sentinel heat Sealer which exerted 20 psi pressure for 0.5 second, was also used to seal the vinyl transfer sheet material on itself, as before, at two sealing temperatures. Adhesion of the cellulose carrier sheet measured 97 and 78 grams at 230° F and 270° F, respectively. There was no separation of the bonded vinyl film surfaces in any of the above tests.

EXAMPLE II

The procedure of Example I was repeated using a regenerated cellulose carrier sheet modified with 11% Avicel PH-105 (FMC Corp. trademark) microcrystalline cellulose. The microcrystalline cellulose is a particulate additive that, when incorporated into the regenerated cellulose carrier, affects the surface smoothness of glossiness of the vinyl film side in contact with the carrier in the vinyl transfer sheet material. In this Example, the vinyl film-protected substrate exhibited a satin finish after the regenerated cellulose carrier sheet had been stripped from the laminate. By comparison, the vinyl films bonded to substrates in Example I all had a glossy surface appearance, once the carrier had been stripped from the laminate.

As before, the vinyl transfer sheet material was bonded to a vinyl wallcovering substrate using the laboratory multiple heat sealer. Bonding results were similiar to those obtained in Example I. When the substrate was in contact with the heated plate of the sealer, good bonding was achieved, as previously, at a temperature between 240° to 400° F. When the vinyl transfer sheet material faced the heated surface of the multiple sealer, good bonding was obtained at 220° F and above (compared with 205° F in Example I), but the bonded transfer sheet meterial again had a poor appearance at 325° F and above. Adhesion of the cellulose carrier of Example II, which contained particulate matter for reducing surface gloss, compared closely with the results in Example I, typically 30 to 40 grams per 2 inch length, when bonded to the wallcovering substrate with the multiple heat sealer.

For the vinyl transfer sheeet material bonded to itself, rather than to a wallcovering substrate, the cellulose carrier adhesion was typically 30 to 50 grams. Unlike the cellulose carrier in the vinyl transfer sheet material of Example I, which bonded to itself across the entire temperature spectrum (168° to 400° F), bonding of the vinyl film surfaces of the vinyl transfer sheet material to itself in Example II was obtained only above 184° F. When the Sentinel Heat Sealer was used to bond the vinyl film surfaces of the same vinyl transfer sheet material together, cellulose carrier adhesion was similar to that obtained in Example I. At sealing temperatures of 230° F and 270° F, cellulose carrier adhesion to the vinyl film thereon was 120 and 72 grams per two inch length, respectively. There was no seperation of the bonded vinyl film surfaces in any of these tests.

EXAMPLE III

In Example III a different vinyl resin formulation was used to coat a regenerated cellulose carrier sheet identical to that of Example I. Procedures and testing methods used in Example I were repeated.

The film-forming resin was a copolymer of 86% by weight vinyl chloride and 14% by weight vinyl acetate but contained only 8 phr Citroflex A-4 plasticizer (compared to 18 phr in Example I), 1.0 phr of kaoline clay as a slip and anti-blocking agent, 5 phr Crystal Soap Wax 147 (Crystal Chemical Corp. trademark) paraffin wax blend conventionally used in coated packaging films, and 8 phr of Foral 105 (Hercules, Inc. trademark) rosin-modified alkyd resin and 1 phr blown rapeseed oil used as blending resins in conjunction with the wax.

The lower level of vinyl plasticizer raised the temperature at which lamination of the vinyl transfer sheet material to the wallcovering substrate would first occur. With the multiple heat sealer, bonding did not occur below 270° F for lamination with the substrate in contact with the heated surface of the sealer. When the vinyl transfer sheet material was placed in contact with the heated surface, good bonding did not result below 240° F, but, as before, the vinyl transfer sheet material, when bonded to the wallcovering substrate, had a poor appearance at 325° F and above.

When the vinyl coated surface of the vinyl transfer sheet material of Example III was bonded to itself, such bonding did not occur with the multiple heat sealer until the heating temperature reached 192° F. Above this temperature, adhesion of the cellulose carrier to the vinyl coating thereon measured between 10 to 30 grams.

Bonding of the cellulose carrier to the vinyl film of the vinyl film of the vinyl transfer sheet material was also examined with the Sentinel Heat Sealer at two sealing temperatures. Adhesion of the cellulose carrier sheet measured as 42 and 51 grams at 230° F and 270° F, respectively, a lower adhesion than had been obtained in Examples I and II. There was no separation of the vinyl film surfaces in any of these tests.

We claim:
1. A method of preparing a protected substrate comprising:
    (a) contacting a vinyl chloride polymer or copolymer substrate with an/exposed film surface of a transfer sheet material, wherein the transfer sheet material comprises (1) a continuous, flexible, non-fibrous cellulosic carrier and (2) a film of plasticized vinyl chloride and vinyl acetate copolymer resin releasably adhered directly onto one side of the non-fibrous cellulosic carrier, the copolymer resin consisting essentially of about 75% to about 95% vinyl chloride and of about 5% to 25% vinyl acetate, all percentages by weight based on the copolymer resin weight, and from about 5 to 20 parts of plasticizer per hundred parts of copolymer resin;
    b. pressing, in the presence of heat, the contacting surfaces of the transfer sheet film and the substrate so as to provide a laminate in which the film is tenaciously bonded to the substrate; and
    c. thereafter cooling the laminate.
2. A method as defined in claim 1, further comprising stripping the non-fibrous cellulosic carrier from the laminate, leaving the vinyl film tenaciously bonded to the vinyl substrate
3. A method as defined in claim 1, wherein the continuous, flexible non-fibrous cellulosic carrier is plasticized, transparent regenerated cellulose.
4. A method as defined in claim 3, wherein the regenerated cellulose sheet is plasticized with glycerine.
5. A method as defined in claim 1, wherein the vinyl copolymer resin consists of about 86% vinyl chloride and about 14% vinyl acetate, all percentages by weight based on the copolymer weight.
6. A method as defined in claim 2, wherein the vinyl film of the transfer sheet material is transparent and wherein the exposed vinyl film surface of the transfer sheet material has indicia printed thereon.
7. A method as defined in claim 5, wherein the vinyl film of the transfer sheet material is transparent and wherein the exposed vinyl film surface of the transfer sheet material has indicia printed thereon.

8. A product made by the method of claim 2.

9. A product made by the method of claim 6.

10. A transfer sheet material which comprises a continuous, flexible, non-fibrous cellulosic carrier and (b) a film of plasticized vinyl chloride and vinyl acetate copolymer resin releasably adhered directly onto one side of the non-fibrous cellulosic carrier, the copolymer resin consisting essentially of about 75% to about 95% vinyl chloride and of about 5% to 25% vinyl acetate, all percentages by weight based on the copolymer resin weight, and from about 5 to 20 parts of plasticizer per hundred parts of copolymer resin.

* * * * *

Disclaimer 4,020,204.—*John Sebring Taylor*, Newark, Del., and *Wilbur Thomas Brader*, Media, Pa. VINYL TRANSFER SHEET MATERIAL AND METHOD FOR APPLYING SAME TO VINYL SUBSTRATE. Patent dated Apr. 26, 1977. Disclaimer filed July 7, 1978, by the assignee, *FMC Corporation*.

Hereby enters this disclaimer to claims 1–10 of said patent.

[*Official Gazette August 29, 1978.*]